United States Patent
Choi et al.

(10) Patent No.: US 10,160,855 B2
(45) Date of Patent: Dec. 25, 2018

(54) NON-PAINTING METALLIC POLYPROPYLENE RESIN COMPOSITION

(71) Applicants: Hyundai Motor Company, Seoul (KR); Kia Motors Corporation, Seoul (KR); Hanwha Total Petrochemical Co., Ltd., Seosan-si (KR)

(72) Inventors: Min Jin Choi, Bucheon-si (KR); Young Ho Choi, Seongnam-si (KR); Yong Bum Lee, Seoul (KR); Ji Hyun Jung, Gwangju (KR); Jae Ho Han, Seoul (KR); Byoung Ho Lee, Seosan-si (KR); Jae Gon Lim, Seoul (KR); Joung Hwan Han, Seosan-si (KR)

(73) Assignees: Hyundai Motor Company, Seoul (KR); Kia Motors Corporation, Seoul (KR); Hanwha Total Petrochemical Co., Ltd., Seosan-si (KR)

(*) Notice: Subject to any disclaimer, the term of this patent is extended or adjusted under 35 U.S.C. 154(b) by 0 days.

(21) Appl. No.: 15/464,965

(22) Filed: Mar. 21, 2017

(65) Prior Publication Data
US 2017/0335098 A1    Nov. 23, 2017

(30) Foreign Application Priority Data
May 18, 2016    (KR) .................. 10-2016-0060502

(51) Int. Cl.
| | |
|---|---|
| *C08L 53/00* | (2006.01) |
| *B29B 13/06* | (2006.01) |
| *B29C 45/00* | (2006.01) |
| *C08K 3/08* | (2006.01) |
| *C08K 5/36* | (2006.01) |
| *B29K 23/00* | (2006.01) |
| *B29K 105/16* | (2006.01) |
| *B29K 505/00* | (2006.01) |
| *B29K 509/02* | (2006.01) |
| *B29L 31/30* | (2006.01) |
| *B60R 19/03* | (2006.01) |

(52) U.S. Cl.
CPC .............. *C08L 53/00* (2013.01); *B29B 13/06* (2013.01); *B29C 45/0001* (2013.01); *C08K 3/08* (2013.01); *C08K 5/36* (2013.01); *B29K 2023/12* (2013.01); *B29K 2105/16* (2013.01); *B29K 2505/00* (2013.01); *B29K 2509/02* (2013.01); *B29K 2995/002* (2013.01); *B29K 2995/0041* (2013.01); *B29L 2031/3044* (2013.01); *B60R 19/03* (2013.01); *C08L 2207/10* (2013.01)

(58) Field of Classification Search
CPC .............. C08L 53/00; C08K 3/08; C08K 5/36
See application file for complete search history.

(56) References Cited

U.S. PATENT DOCUMENTS

| | | | | |
|---|---|---|---|---|
| 6,140,425 | A * | 10/2000 | DeNicola, Jr. ........ | C08F 255/02 525/293 |
| 9,580,585 | B2 * | 2/2017 | Lee ......................... | C08L 23/12 |
| 2005/0119392 | A1 * | 6/2005 | Makagawa ......... | C08F 297/083 524/451 |
| 2005/0250892 | A1 * | 11/2005 | Sugimoto ................ | C08K 9/08 524/437 |
| 2014/0308454 | A1 * | 10/2014 | Park ...................... | C09D 175/04 427/434.6 |

FOREIGN PATENT DOCUMENTS

| | | |
|---|---|---|
| JP | 2004-18629 A | 1/2004 |
| JP | 2004-083608 A | 3/2004 |
| KR | 2001-0109421 A | 12/2001 |
| KR | 10-0334162 B1 | 4/2002 |
| KR | 10-2006-0095157 A | 8/2006 |
| KR | 10-2006-0104110 A | 10/2006 |
| KR | 10-2011-0008598 A | 1/2011 |
| KR | 10-2012-0005256 A | 1/2012 |
| KR | 10-2015-0067472 A | 6/2015 |

* cited by examiner

*Primary Examiner* — Hannah J Pak
(74) *Attorney, Agent, or Firm* — Morgan, Lewis & Bockius LLP

(57) ABSTRACT

A metallic polypropylene resin composition is provided herein. The metallic polypropylene resin composition provides appearance characteristics that are similar to those provided by painting, but without painting. The metallic polypropylene resin composition of the present invention has excellent physical properties such as scratch resistance, and thus may be applied to molding methods, such as a molded in color (MIC) method. The resin composition is useful as a material for automobile interior and exterior parts, as wells as electric and electronic products, which can be molded by the MIC method.

8 Claims, 2 Drawing Sheets

| Metal texture | Fair | Good | Excellent |
|---|---|---|---|
|  |  |  |  |
| Painting specification | MIC (Example 1) | MIC (Examples 2, 3) | MIC (Example 4) |

NON-PAINTING METALLIC POLYPROPYLENE RESIN COMPOSITION

CROSS-REFERENCE TO RELATED APPLICATION

This application claims under 35 U.S.C. § 119(a) the benefit of Korean Patent Application No. 10-2016-0060502, filed on May 18, 2016, the entire contents of which are incorporated herein by reference for all purposes.

BACKGROUND

Technical Field

The present disclosure relates to a metallic polypropylene resin composition that does not need painting, yet provides appearance characteristics similar to those requiring painting. The composition has excellent physical properties such as scratch resistance. The metallic polypropylene resin composition can be applied to a molded in color (MIC) method.

Background Art

A polypropylene resin is used as a raw material for electric and electronic products, automobile interior or exterior materials, office supplies, and the like. The resin provides weight savings due to its low specific weight and ease in recycling. In particular, the polypropylene resin composition is typically used as a paint for an exterior part such as a bumper, a side sill molding, and a garnish for automobiles.

A metal texture high glossy surface is desirable as a design factor for electric and electronic products and automobile interior and exterior parts. In general, in order to impart a metal texture to parts, a painting (under coating) process is additionally carried out on the surface of an injection molded article. Since excessive amounts of solvents are used in the painting process, environmental safety concerns and increased costs can arise because the process includes multiple steps. Another problem that can cause part defects is the poor compatibility of the paint with the substrate. Thus, efforts have being made to develop a resin molded article which may provide characteristics of painting, yet can be manufactured using injection-mold methods without painting (under coating).

Examples of a method of implementing metal texture high glossy characteristics include a molded in color (MIC) method for directly obtaining a high glossy surface by injecting plastic materials. In order to implement high glossy surface characteristics by means of the injection of plastic materials, the roughness of an injection molding surface needs to be minimized and smoothly processed like a mirror surface, and the injection conditions need to be optimized such that the smooth surface may be sufficiently transferred to the surface of a plastic injection material. When a resin having a high injection temperature and low fluidity is used, a mold rapid heating and cooling apparatus needs to be separately installed in order to improve the surface quality of a weld line, and the like. A plastic material such as polycarbonate (PC) and polymethylmethacrylate (PMMA) used in the MIC method, however such engineered plastic materials are expensive and have a high specific weight. The polypropylene resin has weak scratch resistance due to the low hardness. Polypropylene resin is not typically used in MIC non-painting interior and exterior parts due to the dimensional problems caused by high shrinkage.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art, and an object of the present invention is to provide a non-painting metallic polypropylene resin composition which implements high glossy characteristics of metal texture without a painting process.

In some aspects, the present invention provides a non-painting metallic polypropylene resin composition having improved scratch resistance characteristics while maintaining intrinsic mechanical properties of a polypropylene resin.

In certain aspects, the present invention provides an injection non-painting molded article that is molded from the polypropylene resin composition outlined herein.

In other aspects, the present invention provides automobile interior and exterior parts and electric and electronic products as non-painting interior and exterior parts formed by a molded in color (MIC) method. In other words, provided herein is an automobile interior part, an automobile exterior part, an electric part (e.g., an automobile electric part), or an electronic part (e.g., an automobile electronic part) comprising a molded article molded by the non-paining metallic polypropylene resin composition outlined herein.

In one aspect, the present invention provides a non-painting metallic polypropylene resin composition comprising: from about 52 to 97 wt % of a high-crystalline polypropylene resin having an isotactic pentad fraction of from about 96% or more as measured by a $C^{13}$-NMR method; from about 1 to 30 wt % of an olefin-based rubber; from about 1 to 15 wt % of an ultra-fine talc having an average particle diameter of from about 0.1 to 1 μm; from about 0.1 to 3.0 wt % of a scratch-resistant additive of a silica powder; and from about 0.1 to 3.0 parts by weight of metal particles with respect to 100 parts by weight of the overall resin composition.

In some embodiments of the present invention, the high-crystalline polypropylene resin may be a polypropylene resin of a high-crystalline block copolymer.

In another embodiment of the present invention, the high-crystalline polypropylene resin may be a polypropylene resin of a block copolymer having a polydispersity index (PI) of from about 5 or more and a wide molecular weight distribution.

In still another embodiment of the present invention, the olefin-based rubber may be an ethylene-butadiene rubber, an ethylene-octadiene rubber, or a mixture thereof.

In yet another embodiment of the present invention, the scratch-resistant additive may be a silica powder having a melt flow index (MI) of from about 80 to 130 g/10 min and an average particle diameter of from about 1 to 5 μm.

In another embodiment of the present invention, the metal particles may be coin-type alumina particles having an average particle diameter of from about 5 to 50 μm.

In another aspect, the present invention provides an injection non-painting molded article molded by the non-painting metallic polypropylene resin composition.

In a preferred embodiment of the present invention, the molded article may be an automobile interior part, an automobile exterior part, an automobile electric product, or an automobile electronic product, which is molded by a molded in color (MIC) method.

The metallic polypropylene resin composition of the present invention provides an injection molded article having an excellent metal texture without the need for painting a metal texture onto the injection molded article, thereby reducing production costs of the metal texture parts.

The metallic polypropylene resin composition of the present invention has excellent scratch-resistant characteristics. Such a resin composition is useful for producing an injection molded article with an excellent appearance. This injection molded article can be made without generating a weld line even by the MIC method.

The metallic polypropylene resin composition of the present invention has a weight saving effect. This effect may be result from a decrease in content of inorganic materials due to an improvement in scratch-resistant characteristics even though the content of inorganic materials is decreased compared to the existing composition.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
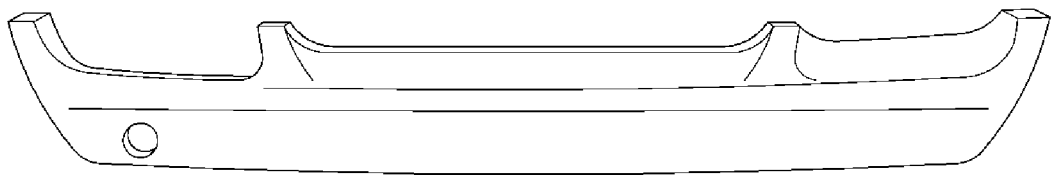
FIG. 1 is a photograph of an automobile bumper molded by a molded in color (MIC) method using the resin composition of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a non-painting metallic polypropylene resin composition, which implements a metal texture similar to that when a painting is applied, without performing the painting. Specifically, the resin composition of the present invention comprises: (a) from about 52 to 97 wt % (e.g., about 52, 53, 54, 55, 56, 57, 58, 59, 60, 61, 62, 63, 64, 65, 66, 67, 68, 69, 70, 71, 72, 73, 74, 75, 76, 77, 78, 79, 70, 80, 81, 82, 83, 84, 85, 86, 87, 88, 89, 90, 91, 92, 93, 94, 95, 96 or about 97%) of a high-crystalline polypropylene resin having an isotactic pentad fraction of 96% or more measured by a $C^{13}$-NMR method; (b) from about 1 to 30 wt % (e.g., about 1%, 2, 3, 4, 5, 6, 7, 8, 9, 10, 11, 12, 13, 14, 15, 16, 17, 18, 18, 20, 21, 22, 23, 24, 25, 26, 27, 28, 29 or about 30%) of an olefin-based rubber; (c) from about 1 to 15 wt % (e.g., about 1%, 2, 3, 4, 5, 6, 7, 8, 9, 10, 11, 12, 13, 14, or 15%) of an ultra-fine talc having an average particle diameter of from about 0.1 to 1 μm (e.g., about 0.1, 0.2, 0.3, 0.4, 0.5, 0.6, 0.7, 0.8, 0.9 or about 1.0 μm); (d) from about 0.1 to 3.0 wt % (e.g., about 0.1 wt %, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or about 3 wt %) of a scratch-resistant additive of a silica powder; and (e) from about 0.1 to 3.0 parts (e.g., about 0.1 parts, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or about 3.0 parts) by weight of metal particles with respect to 100 parts by weight of the overall resin composition.

The constituent components constituting the non-painting metallic polypropylene resin composition of the present invention will be described in more detail as follows.

High-Crystalline Polypropylene Resin

A polypropylene resin used in the present invention is a high-crystalline polypropylene resin. The high-crystalline polypropylene resin is a polypropylene resin having a high isotactic index, and is specifically a high-crystalline resin having an isotactic pentad fraction of 96% or more (e.g., about 96%, 97%, 98%, about 99%, or more) as measured by a $C^{13}$-NMR method.

The high-crystalline polypropylene resin may be a polypropylene resin of a high-crystalline homopolymers, a polypropylene resin of a high-crystalline block copolymer, or a mixture thereof. In some embodiments, a polypropylene resin of a high-crystalline block copolymer may be used in terms of balanced rigidity and impact. The polypropylene resin of the block copolymer may be one or more selected from the group consisting of a propylene-ethylene block copolymer, a propylene-1-butene block copolymer, and a propylene-1-hexene block copolymer.

As the high-crystalline polypropylene resin, a polypropylene resin of a block copolymer having a polydispersity index (PI) of from about 5 or more (e.g., about 5, 6, 7, 8, 9, 10, 15, 20, 25, 30, 35, 40 45, 50 or more), specifically, a polydispersity index of from about 5 to 12 (e.g., about 5, 6, 7, 8, 9, 10, 11 or 12) and a wide molecular weight distribution may be more preferably used. A polypropylene resin of a block copolymer having a high polydispersity index of from about 5 or more (e.g., about 5, 6, 7, 8, 9, about 10, or more) has good moldability in terms of processing.

In particular, it is possible to obtain an effect of reducing the content of inorganic components included as an ultra-fine talc and a scratch-resistant additive by using a high-crystalline polypropylene resin having an isotactic pentad fraction of 96% or more measured by a $C^{13}$-NMR method in terms of tacticity as the high-crystalline polypropylene resin in the present invention. The high-crystalline polypropylene resin having the aforementioned characteristics may be selected and used to improve physical properties of the resin composition, such as flexibility, rigidity, and low temperature impact resistance, so that required physical properties may be satisfied even though the content of the ultra-fine talc and the scratch-resistant additive added for the purpose of reinforcing physical properties is reduced.

The high-crystalline polypropylene resin (HIPP) may be included in a content range of from about 52 to 97 wt % (e.g., about 52, 53, 54, 55, 56, 57, 58, 59, 60, 61, 62, 63, 64, 65, 66, 67, 68, 69, 70, 71, 72, 73, 74, 75, 76, 77, 78, 79, 70, 80, 81, 82, 83, 84, 85, 86, 87, 88, 89, 90, 91, 92, 93, 94, 95, 96 or about 97%), preferably from about 60 to 80 wt % (e.g., about 60%, 61, 62, 63, 64, 65, 66, 67, 68, 69, 70, 71, 72, 73, 74, 75, 76, 77, 78, 79, or about 80%) in the resin composition of the present invention. When the content of the high-crystalline polypropylene resin (HIPP) is less than 52 wt %, which is a small value, characteristics of the polypropylene resin deteriorate, so that it is difficult to properly exhibit the function of a molded article, and when the content is more than 97 wt %, it may be difficult to achieve a desired effect because the content of the other components is low.

Olefin-Based Rubber

As a rubber component used in the present invention, an α-olefin-based rubber or a styrene-based rubber may be used, and preferably, an α-olefin-based rubber may be used.

The α-olefin-based rubber may be a polymer of an α-olefin-based monomer selected from the group consisting of ethylene, propylene, 1-butene, 1-pentene, 1-hexene, 1-octene, 4-methyl-1-pentene, 1-heptene, and the like, and specifically, ethylene-butene rubber (EBR), ethylene-octene rubber (EOR), or a mixture thereof may be included. Further, the α-olefin-based rubber may be a copolymer of an α-olefin-based monomer and a diene-based monomer, and specifically, ethylene-butadiene rubber, ethylene-octadiene rubber, ethylene-propylene-diene rubber, or a mixture thereof may be included.

In the α-olefin-based rubber, ethylene-octene rubber (EOR) has excellent impact characteristics at low temperature, and thus, is very suitable as a use of a material for an exterior material.

An olefin-based rubber may be included in a content range of from about 1 to 30 wt % (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30%), preferably 10 to 20 wt in the resin composition of the present invention. When the content of the olefin-based rubber is less than 1 wt %, which is a small value, impact characteristics may deteriorate, and when the content is more than 30 wt %, an effect of reinforcing impact may be expected, but it may be difficult to maintain the balance between physical properties due to the insufficient rigidity.

Ultra-Fine Talc

The talc used in the present invention is an ultra-fine talc having an average particle diameter of from about 0.1 to 1 μm (e.g., about 0.1, 0.2, 0.3, 0.4, 0.5, 0.6, 0.7, 0.8, 0.9, or about 1.0 μm). The talc is used in order to reinforce physical properties such as flexibility, rigidity, and low temperature impact resistance to the resin composition. When the average particle diameter is more than 1 μm, there is a problem with implementing the color sense of a part appearance, so that the average particle diameter, which is as small as possible, is advantageous. But when a talc having an extremely small particle diameter of less than 0.1 μm is used, it is difficult to introduce the talc into a compounding process, and there may be a problem with managing the content.

An ultra-fine talc may be included in a content range of from about 1 to 15 wt %, (e.g., about 1%, 2, 3, 4, 5, 6, 7, 8, 9, 10, 11, 12, 13, 14, or about 15%), preferably from about 5 to 10 wt % (e.g., about 5, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or about 15%) in the resin composition of the present invention. When the content of the ultra-fine talc is less than 1 wt %, which is a small value, an effect of reinforcing physical properties may not be obtained. When the content is more than 15 wt %, a weight saving effect may not be obtained due to an increase in weight of the resin composition, and it is difficult to expect that the ultra-fine talc is perfectly dispersed during the compounding process. As such, an effect of reinforcing physical properties may not be obtained.

Scratch-Resistant Additive

The scratch-resistant additive used in the present invention can be a silica powder. The scratch-resistant additive is used in order to improve the appearance of a molded article by enhancing the scratch-resistant performance, and in particular, the scratch-resistant performance may be a very important factor in manufacturing a molded article by an MIC method.

As the related art, a resin composition including a siloxane-based scratch-resistant additive was known, but there occurred a problem such as generation of spots on the surface of a molded article when the article is injected by applying the MIC method. However, the silica powder used in the present invention has an outstanding effect of improving the appearance because the surface of the molded article has excellent scratch-resistance, and spots and the like are not generated even though the molded article is injection-molded by the MIC method.

As the silica powder, it may be more preferable to use a silica powder having a melt flow index (MI) of from about 80 to 130 g/10 min (e.g., about 80 g/10 min, 85, 90, 95, 100, 105, 110, 115, 120, 125, or about 130 g/10 min) and an average particle diameter of from about 1 to 5 μm (e.g., about 1 μm, 1.5, 2, 2.5, 3, 3.5, 4, 4.5, or about 5 μm). When the melt flow index of the silica powder is less than 80 g/10 min, the scratch resistance effects may be poor, and when the index is more than 130 g/10 min, spots may be generated on the surface of the part.

A scratch-resistant additive may be included in a content range of from about 0.1 to 3.0 wt % (e.g., about 0.1%, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or about 3.0 wt %), preferably from about 0.5 to 2.0 wt % (e.g., about 0.1%, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or about 2.0 wt %) in the resin composition of the present invention. When the content of the scratch-resistant additive is less than 0.1 wt %, which is a small value, an effect of improving the scratch-resistant performance may not be obtained, and when the content is more than 3.0 wt %, it is difficult to additionally improve the scratch-resistance performance, and rather, there may occur problems of an increase in weight and an increase in costs.

Metal Particles

The metal particles used in the present invention are used in order to impart a metal texture. The metal particles may include aluminum (Al) particles, zinc (Zn) particles, copper (Cu) particles, pearl particles, and the like. In the present invention, the selection of the types of metal particles is not particularly limited, but it is important to appropriately select and use the sizes and shapes of metal particles such that the metal texture may be well implemented. In some embodiments, aluminum metal particles are used. In certain embodiments, the use of coin-type alumina particles having an average particle diameter of from about 5 to 50 μm (e.g., about 5 μm, 6, 7, 8, 9, 10, 11, 12, 13, 14, 15, 16, 17, 18, 19, 20, 21, 23, 24, 25, 26, 27, 28, 29, 30, 31, 32, 33, 34, 35, 36, 37, 38, 38, 39, 40, 41, 42, 43, 44, 45, 46, 47, 48, 49, or about 50 μm) may be suitable for the appearance of the metal texture.

The metal particles may be included in a content range of from about 0.1 to 3.0 parts (e.g., about 0.1 part, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or about 3.0 parts) by weight based on 100 parts by weight of the resin composition of the present invention. When the content of the metal particles is less than 0.1 parts by weight, which is a small value, it may be difficult to implement the metal texture. When the content is more than 3.0 parts by weight, there may occur a problem of an increase in weight, and a problem of degrading physical properties of the resin composition.

Additive

Additives typically used in the art may be additionally used in the resin composition of the present invention. For example, a heat-resistant stabilizer, a weathering stabilizer, an antistatic agent, a lubricant, a slip agent, a nucleating agent, a flame retardant, and the like may be included as an additive, and these additives may be added in a range that is not outside the objects of the present invention.

In the present invention, a molded article may be prepared by injection-molding the resin composition constituting the composition component and content ratio as described above. The molded article is a non-painting molded article. In other words, an additional painting process is omitted during the manufacture of the molded article. In particular, the resin composition of the present invention has an advantage in that a weld line, a spot, and the like are not generated even though the molded article is injection-molded by a molded in color (MIC) method. Accordingly, the resin composition of the present invention is useful as a material for interior and exterior parts and electric and electronic products of an automobile, which require the high glossy surface of the metal texture.

The present invention as described above will be described in more detail with reference to the following Examples, and the present invention is not limited thereto.

EXAMPLES

The following examples illustrate the invention and are not intended to limit the same.

Examples 1 to 4 and Comparative Examples 1 and 2. Preparation of Metallic Polypropylene Resin Composition The composition components shown below were weighted at a content ratio in the following Table 5, and were introduced into a kneading extruder (manufactured by SM PLATEK, diameter 32 mm, L/D 40:1) and kneaded to prepare a resin composition.

[Composition Components]

High-Crystalline Polypropylene Resin

A propylene-ethylene block copolymer shown in the following Table 1 was used.

TABLE 1

| PP Resin | Flow index[1] [g/10 min] | PI[2] (230° C.) | Weight average molecular weight [g/mol] | Isotactic pentad fraction (%)[3] |
|---|---|---|---|---|
| ①PP Block-1 | 22 | 3.7 | 210,000 | 96.4 |
| ②PP Block-2 | 60 | 5.9 | 189,000 | 96.9 |
| ③PP Block-3 | 100 | 4.3 | 168,000 | 96.6 |

[1]Flow index: was measured at 230° C., 2.16 Kg
[2]Polydispersity Index (PI): is a measure of a molecular weight distribution as a cross over point of G' (loss modulus) and G" (Storage modulus) as rheological properties
[3]Isotactic pentad fraction: was measured by $C^{13}$-NMR.

(b) Olefin-Based Rubber

The ethylene-octene rubber (EOR) shown in the following Table 2 was used.

TABLE 2

| Rubber | Flow index[1] [g/10 min] | Density (Kgf/cm$^3$) |
|---|---|---|
| ① EOR-1 | 1.0 | 0.857 |
| ② EOR-2 | 5.2 | 0.862 |

[1]Flow index: measured at 190° C., 2.16 Kg (c) Talc

As shown in the following Table 3, talc having different average particle diameters was used.

TABLE 3

| Talc | Average particle diameter (μm) |
|---|---|
| ①Talc-1 | 3~6 |
| ②Talc-2 | 0.65 |

(d) Scratch-Resistant Additive

A synthetic silica powder having a melt flow index of 100 g/10 min (MI, 230° C., 2.16 Kg) and an average particle diameter of 1 to 5 μm was used.

(e) Metal Particles

As shown in the following Table 4, alumina particles having different average particle diameters were used.

TABLE 4

| Metal particle | Average particle diameter (μm) | Shape |
|---|---|---|
| ① Al-1 | 24 | Coin-type |
| ② Al-2 | 12 | Coin-type |

TABLE 5

|  |  | Example (wt %) | | | | Comparative Example (wt %) | |
|---|---|---|---|---|---|---|---|
| Classification | | 1 | 2 | 3 | 4 | 1 | 2 |
| PP Resin | PP Block-1 | 10 | 10 | 10 | 10 | 13 | 12 |
|  | PP Block-2 | 33 | 33 | 51 | 51 | — | 18 |
|  | PP Block-3 | 30 | 30 | 10 | 10 | 46 | 25 |
| Rubber | EOR-1 | 18 | 18 | 10 | 10 | — | — |
|  | EOR-2 | — | — | 10 | 10 | 22 | 26 |
| Talc | Talc-1 | 8 | — | — | — | 18 | 18 |
|  | Talc-2 | — | 8 | 8 | 8 | — | — |
| Scratch-resistant additive | Silica powder | 1 | 1 | 1 | 1 | 1 | 1 |
| Metal particle (parts by weight) | Al-1 | 1.0 | 1.5 | 2.0 | — | — | — |
|  | Al-2 | — | 0.5 | — | 2.5 | — | — |

*Parts by weight: weight of metal particles added based on 100 parts by weight of the resin composition Test Examples Measurement of Physical Properties of Resin Composition Samples for an appearance test were manufactured from the resin compositions prepared in Examples 1 to 4 and Comparative Examples 1 and 2 by means of the following method. Specifically, the resin compositions were dried at 90° C. in an oven for 3 hours in consideration of deterioration in physical properties due to the absorption of moisture. Samples for an appearance test were manufactured from the dried resin compositions by using an extruder (Si180-III manufactured by Toyo, Japan, clamping force 180 tons). In this case, as the injection conditions, the injection temperature was 180/200/200/210/210° C. from a raw material supply hopper part to a nozzle, and the injection pressure was maintained at 60 to 100 bar.

Samples for measuring specific weight and mechanical properties were manufactured from the resin compositions prepared in Examples 1 to 4 and Comparative Examples 1 and 2 by means of the following method. Specifically, the resin compositions were pelleted by using a co-rotating twin screw extruder, and then were again injection-molded to prepare samples.

Physical properties of each sample manufactured above were measured, and are shown in the following Table 6.

[Method of Measuring Physical Properties]

Melt index: measured at 230° C., 2.16 kg in accordance with the ASTM D1238.

Density: measured in accordance with the ASTM D1505.

Tensile strength: measured at a yarn speed of 50 mm/min by manufacturing a sample having a thickness of 3.2 mm in accordance with the ASTM D638.

Flexural modulus: measured at a span of 48 mm and a yarn speed of 5 mm/min by manufacturing a sample having a thickness of 3.2 mm in accordance with the ASTM D790.

Impact strength: an Izod impact test was carried out at −30° C. by manufacturing a notched type sample having a thickness of 3.2 mm.

Heat distortion temperature (HDT): the temperature at which distortion occurred at a load of 4.6 kg was measured by using a HDT measuring apparatus.

Scratch resistance (Delta L): the degree of change in scratch resistance was measured depending on the load by providing a weight having a load with a scratch needle in accordance with the Erichsen test. The sample was left to stand at room temperature for 48 hours or more, and then measured.

Metal texture: evaluated by the Design Team in Hyundai-Kia Motor Company, and the results are shown while being classified into excellent, good, fair, and poor.

TABLE 6

| Classification | Example | | | | Comparative Example | |
|---|---|---|---|---|---|---|
|  | 1 | 2 | 3 | 4 | 1 | 2 |
| Melt index [g/10 min] | 43.6 | 45.7 | 37.8 | 40.7 | 35.7 | 33.6 |
| Density [g/cm$^3$] | 0.961 | 0.953 | 0.950 | 0.955 | 1.019 | 1.011 |
| Tensile strength (Kg/cm$^2$) | 206 | 201 | 210 | 208 | 198.6 | 187.4 |
| Flexural modulus (Kg/cm$^2$) | 16,600 | 16,800 | 16,900 | 17,090 | 16,660 | 15,239 |
| Impact strength [KJ/m$^2$] | 4.9 | 4.8 | 5.2 | 4.9 | 3.0 | 4.0 |
| Heat distortion temperature (° C.) | 121 | 123 | 112 | 116 | 121.9 | 125.4 |
| Scratch resistance [Delta L] | 1.0 | 1.1 | 1.3 | 1.2 | 3.8 | 3.5 |
| Metal texture | Fair | Good | Good | Excellent | Poor | Poor |

Figure 2:
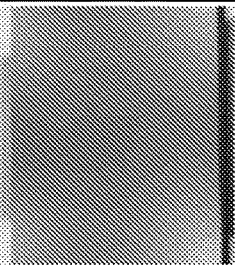
FIG. 2 is a photograph which confirms the metal texture of the resin compositions prepared in Examples 1 to 4.
Figure 2:
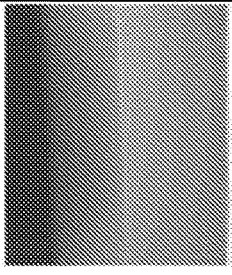
Figure 2:
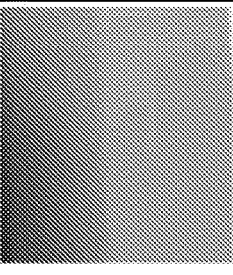
Figure 2:
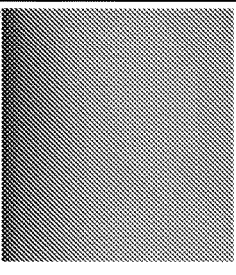

FIG. 2 is a photograph which confirms the metal texture of the resin compositions prepared in Examples 1 to 4.

FIG. 1 illustrates a photograph of a molded article of an automobile bumper injection-molded by the MIC method by using the resin composition prepared in Example 4. According to the photograph of FIG. 1, the results confirm that the metal texture is excellent, and a weld line and a flow mark are not generated.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A non-painting metallic polypropylene resin composition comprising:
from about 52 to 97 wt % of a high-crystalline polypropylene resin having an isotactic pentad fraction of from about 96% or more as measured by a C$^{13}$-NMR method;

from about 1 to 30 wt % of an olefin-based rubber;

from about 1 to 15 wt % of an ultra-fine talc having an average particle diameter of from about 0.1 to 1 μm;

from about 0.1 to 3.0 wt % of a scratch-resistant additive of a silica powder; and from about 0.1 to 3.0 parts by weight of metal particles with respect to 100 parts by weight of the overall resin composition, wherein the silica powder has a melt flow index (MI) of from about 80 to 130 g/10 min and an average particle diameter of from about 1 to 5 μm.

2. The non-painting metallic polypropylene resin composition of claim 1, wherein the high-crystalline polypropylene resin is a polypropylene resin of a high-crystalline block copolymer.

3. The non-painting metallic polypropylene resin composition of claim 2, wherein the high-crystalline block copolymer is one or more selected from a group consisting of a propylene-ethylene block copolymer, a propylene-1-butene block copolymer, and a propylene-1-hexene block copolymer.

4. The non-painting metallic polypropylene resin composition of claim 1, wherein the high-crystalline polypropylene resin is a polypropylene resin of a block copolymer having a polydispersity index (PI) of from about 5 or more.

5. The non-painting metallic polypropylene resin composition of claim 1, wherein the olefin-based rubber is an ethylene-butene rubber, an ethylene-octene rubber, or a mixture thereof.

6. The non-painting metallic polypropylene resin composition of claim 1, wherein the metal particles are coin-shaped alumina particles having an average particle diameter of from about 5 to 50 μm.

7. An injection non-painting molded article molded by the resin composition of claim 1.

8. The injection non-painting molded article of claim 7, wherein the molded article is an automobile interior part, an automobile exterior part, an electric product, or an electronic product that is molded by a molded in color (MIC) method.

* * * * *